(12) United States Patent
Park et al.

(10) Patent No.: US 9,025,781 B2
(45) Date of Patent: May 5, 2015

(54) SOUND QUALITY EVALUATION APPARATUS AND METHOD THEREOF

(71) Applicant: Samsung Electronics Co., Ltd., Suwon-si, Gyeonggi-do (KR)

(72) Inventors: Sung Su Park, Seoul (KR); Tae Gil Eum, Suwon-si (KR); Eun Seok Im, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 385 days.

(21) Appl. No.: 13/658,195

(22) Filed: Oct. 23, 2012

(65) Prior Publication Data

US 2013/0129097 A1 May 23, 2013

(30) Foreign Application Priority Data

Nov. 18, 2011 (KR) .................. 10-2011-0121149

(51) Int. Cl.
*H04R 29/00* (2006.01)
*G10L 25/69* (2013.01)

(52) U.S. Cl.
CPC ................... *G10L 25/69* (2013.01)

(58) Field of Classification Search
None
See application file for complete search history.

(56) References Cited

U.S. PATENT DOCUMENTS

| | | | | |
|---|---|---|---|---|
| 2005/0195993 | A1* | 9/2005 | Kwon et al. | 381/102 |
| 2007/0036364 | A1* | 2/2007 | Okuno et al. | 381/59 |
| 2011/0002471 | A1 | 1/2011 | Wihardja et al. | |
| 2013/0142360 | A1* | 6/2013 | Potard | 381/98 |
| 2014/0140522 | A1* | 5/2014 | Deng | 381/59 |

OTHER PUBLICATIONS

Extended European Search Report dated Feb. 8, 2013 in European Patent Application No. 12190750.5.
Jean-Jacques Fuchs, "Estimating the Number of Sinusoids in Additive White Noise", IEEE Transactions on Acoustics, Speech, and Signal Processing, vol. 36, No. 12, Dec. 1998, pp. 1846-1853.
Steve F. Temme, "Are You Shipping Defective Loudspeakers to Your Customers?", Listen Inc, XP007921507, Sep. 2008, pp. 1-5.

* cited by examiner

*Primary Examiner* — Paul Huber
(74) *Attorney, Agent, or Firm* — Staas & Halsey LLP

(57) ABSTRACT

An apparatus for evaluating sound quality and a method thereof may include generating an original sound, measuring a test sound generated from a subject of sound quality evaluation, analyzing a signal of the test sound measured according to a time domain, generating a plurality delay signals that are delayed from the signal of the time domain by one period, determining a degree of matching by matching the signal of the time domain to each delay signal, determining whether a white nose is occurred based on the degree of matching, and outputting the status of the white noise on the subject of the sound evaluation. The signal of the test sound may be analyzed according to a frequency domain, and a degree of occurrence of buzz and rattle is determined based on a fundamental frequency of the frequency domain and a plurality of Harmonics corresponding to the frequency domain.

38 Claims, 13 Drawing Sheets

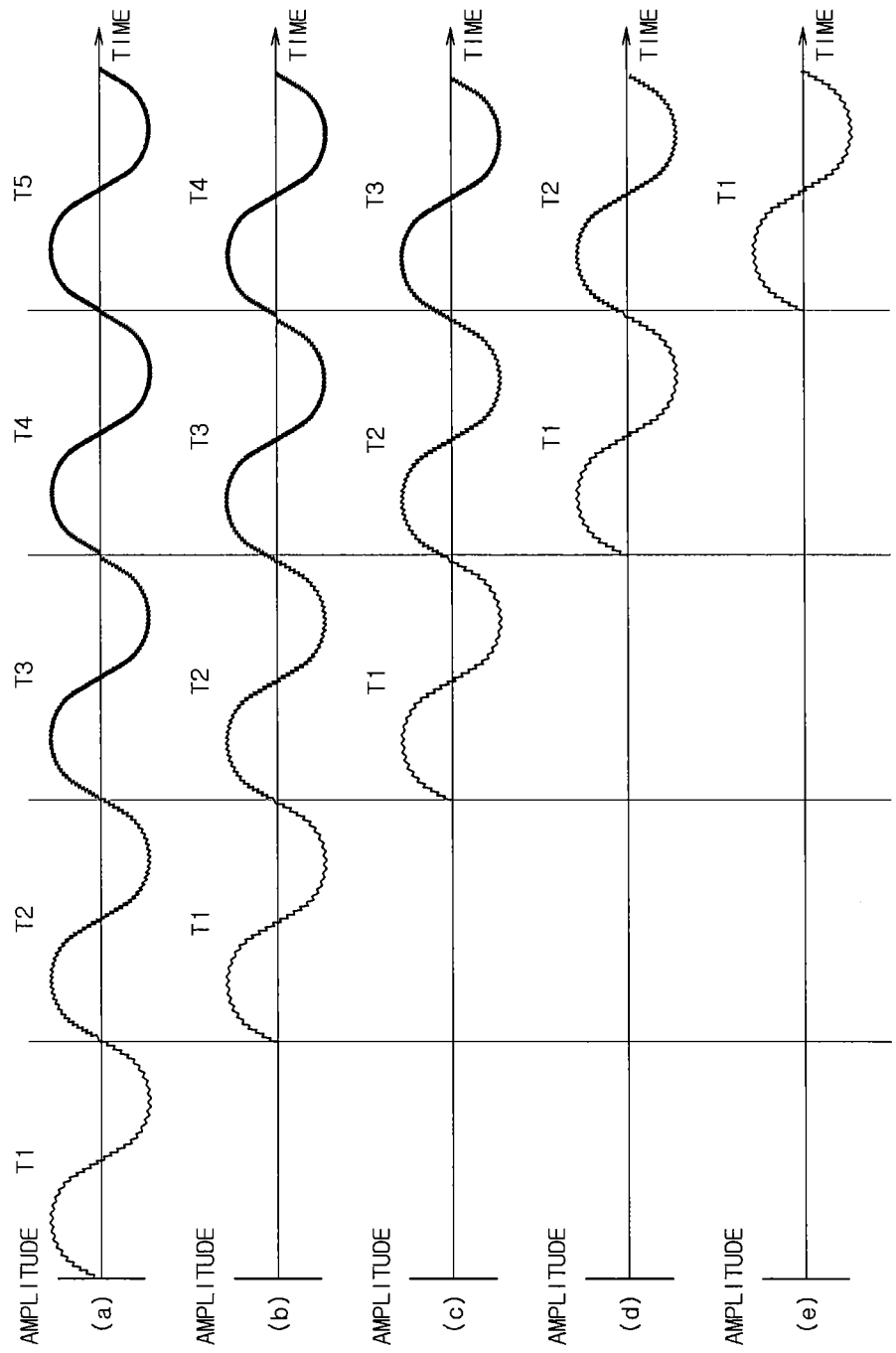

SOUND QUALITY EVALUATION APPARATUS AND METHOD THEREOF

CROSS-REFERENCE TO RELATED APPLICATIONS

This application claims the priority benefit of Korean Patent Application No. 2011-0121149, filed on Nov. 18, 2011 in the Korean Intellectual Property Office, the disclosure of which is incorporated herein by reference.

BACKGROUND

1. Field

Embodiments relate to a sound quality evaluation apparatus configured to evaluate a quality of a sound which is output from a sound output apparatus and a method thereof.

2. Description of the Related Art

A sound output apparatus, such as a cellular phone, a camera, a camcorder, a MP3 device, a television, or an audio device, configured to output a sound is subject to a sound quality evaluation in a production/manufacturing process prior to a shipment.

A sound quality evaluation of a sound output apparatus is entirely performed according to a sensory test of a worker. Since such task is performed by a worker, a difference in sound quality of a sound output apparatus shipped by each different worker occurs, and a possibility of a hearing impairment, an increase of a fatigue from a workload, and a reduced productivity may be developed due to a repeated sound quality evaluation performed by a worker.

Since a subjective factor is intervened in such sound quality evaluation, a quantitative process of a sound quality evaluation is needed.

For such, a plurality of listeners were provided with a sound quality evaluation questionnaire, and with the result attained, a single sound quality evaluation model may be created, or with the audio signal measured may be converted into numeric figures such as THD (Total Harmonic Distortion), SNR (Signal to Noise Ratio), etc. through a frequency analysis method.

THD is a category configured to describe a performance of an amplifier, and examines a characteristic of an audio signal transmitted in the form of an electrical signal, not to examine a characteristic of an audio signal transmitted via air.

A method using a sound quality evaluation model is mainly used in a tuning process of an apparatus development stage, and a method to convert a sound quality evaluation category into numeric figures is used for a quality assurance of a finished product in a development or in a mass production stage.

Such sound quality evaluation of a sound output apparatus requires to be tested under a condition of a dead-sound chamber, and therefore, a loss of space/cost is resulted in by establishing a dead-sound chamber. Also, the sound quality evaluation in a dead-sound chamber may only be used for a sound output apparatus of a finished product or in a development stage, and therefore is less appropriate for a sound output apparatus at a production/manufacturing stage.

In addition, THD and SNR used for evaluating sound quality are limited in evaluating a sound quality of an apparatus.

In particular, even a fair quality sound output apparatus having small output capacity, such as a receiver of a mobile terminal or a speaker of a cellular phone or a camera, is with high THD, and therefore, the difference in THD between a fair quality apparatus and a defective apparatus is not clearly detected, thereby is limited in evaluating a sound quality.

In addition, SNR may be reliable if tested under a condition of a dead-sound chamber. However, in a condition where a surrounding noise is significant, such as a production/manufacturing site, the measured value may change according to the surrounding situation.

Therefore, an automated sound quality evaluation apparatus is needed in order to secure uniform sound quality of a sound output apparatus and to improve productivity of a sound output apparatus.

SUMMARY

In an aspect of one or more embodiments, there is provided a sound quality evaluation apparatus and a method thereof, capable of measuring a test sound output from a subject of sound quality evaluation, analyzing the test sound measured according to a time domain and a frequency domain to determine whether an irregular buzz and rattle and a white noise are occurred from the subject of the sound quality evaluation, and evaluating the sound quality of the subject of the sound quality according to the white noise and the irregular vibration determined.

In an aspect of one or more embodiments, there is provided a sound quality evaluation apparatus and a method thereof, capable of determining a sound volume in decibel units based on a signal of a time domain, determining whether a defectiveness by a broken sound and a mute sound exists, determining occurrence of a broken sound based on a signal of a frequency domain, and evaluating a sound quality of a subject of a sound quality based on the sound volume, the mute sound, and the normalcy of the sound tone and the occurrence of the broken sound.

In an aspect of one or more embodiments, there is provided a sound quality evaluation apparatus and a method thereof, capable of converting evaluation information on sound volume, a white noise, a mute sound, a sound tone, and a buzz and rattle of a subject of a sound quality evaluation into numeric figures and outputting the information.

In an aspect of one or more embodiments, there is provided an apparatus for evaluating sound quality includes an original sound generating unit, a test sound measuring unit, an analyzing unit, a determining unit, a controlling unit and a reporting unit. The original sound generating unit is configured to generate an original sound. The test sound measuring unit is configured to measure a test sound generated from a subject of sound quality evaluation. The analyzing unit is configured to analyze the test sound according to a frequency domain. The determining unit is configured to determine a degree of occurrence of a buzz and rattle occurred based on a plurality of Harmonics corresponding to a fundamental frequency in the frequency domain. The controlling unit is configured to control an occurrence of the original sound and control such that the degree of occurrence of a buzz and rattle is output. The reporting unit is configured to output the degree of occurrence of a buzz and rattle generated from the subject of sound quality evaluation.

The determining unit may calculate an average size of surrounding frequencies for each Harmonic, may calculate each Peak by deducting the average size of the surrounding frequencies from a size of each Harmonic, may calculate a Peak Sum by adding each Peak, and may determine the degree of occurrence of the buzz and rattle based on the Peak Sum calculated.

The determining unit may determine a sound volume of the measured tested sound as a sound volume in decibel units based on a signal of the measured test sound.

The determination unit may check a center frequency of the frequency domain, and may determine whether a sound tone is normal by comparing a frequency of the original sound with the checked center frequency.

The controlling unit may control a halt of the original sound generating unit and an operation of the test sound measuring unit when testing a mute sound. The determining unit may determine whether a noise is generated in a state of a mute sound by determining if a signal of a test sound measured at the time of the original sound generating unit is halted is within a range allowed.

The determining unit may determine a sound volume of the measured test sound as a sound volume in decibel units based on a signal of the measured test sound, and may determine whether a broken sound is occurred by comparing a minimum value of the sound volume determined with a maximum value of the sound volume determined in decibel units.

The determining unit may calculate an auto-correlation coefficient with reference to a signal of the test sound measured, and may determine whether a white noise is occurred based on the auto-correlation coefficient calculated.

In an aspect of one or more embodiments, there is provided an apparatus for evaluating sound quality includes an original sound generating unit, a test sound measuring unit, an analyzing unit, a determining unit, a controlling unit and a reporting unit. The original sound generating unit is configured to generate an original sound. The test sound measuring unit is configured to measure a test sound generated from a subject of sound quality evaluation. The analyzing unit is configured to analyze the measured test sound according to a time domain. The determining unit is configured to generate a plurality of delay signals by delaying a signal of the time domain by a certain period at a time, and to determine whether a white noise is occurred by comparing the signal of the time domain with each delay signal. The controlling unit is configured to control an occurrence of the original sound and to control such that a status of occurrence of the white noise is output. The reporting unit is configured to output a status whether a white noise is generated from the subject of sound quality evaluation.

The determining unit may calculate an auto-correlation coefficient for each delay signal by comparing the signal of the time domain with each delay signal, and determines whether a white noise is occurred based on a change of the each auto-correlation coefficient calculated.

The determining unit may compare a first auto-correlation coefficient which is calculated by comparing a first delay signal, which is one of the delay signals, with the signal of the time domain, with a second auto-correlation coefficient which is calculated by comparing a second delay signal that is delayed by one period than the first delay signal among the delay signals with the signal of the time domain; and may determine a defect by an occurrence of a white noise if the second auto-correlation coefficient is greater than the first auto-correlation coefficient.

The determining unit may determine a defect by an occurrence of a white noise if the first auto-correlation coefficient is greater than the second auto-correlation coefficient by a certain value or above.

The determining unit may determine a sound volume of the measured test sound as a sound volume in decibel units based on a signal of the measured test sound, and may determine whether a sound volume is normal by comparing the determined sound volume in decibel units with a standard sound volume.

The analyzing unit may analyze a signal of the measured test sound according to a frequency domain; and the determining unit checks a center frequency of the frequency domain, and may determine whether a sound tone is normal by comparing the checked center frequency with a frequency of the original sound.

The determining unit may determine a degree of occurrence of a buzz and rattle based on a size of a plurality of Harmonics corresponding to a fundamental frequency in the frequency domain.

The controlling unit may control a halt of the original sound generating unit and an operation of the test sound measuring unit, and the determining unit may determine whether a noise is generated in a state of a mute sound by determining if a signal of a test sound measured at the time of the original sound generating unit is halted is within a range allowed.

The determining unit may determine a sound volume of the measured test sound as a sound volume in decibel units based on a signal of the measured test sound, may divide the sound volume in decibel units into a plurality of sections according to a time, and may determine whether a broken sound is occurred by calculating a rate of difference between a minimum value of the sound volume and a maximum value of the sound volume at each section.

In accordance with an aspect of one or more embodiments, there is provided a method of evaluating sound quality is as follows. An original sound may be generated. A test sound may be generated from a subject of sound quality evaluation is measured. The measured test sound may be analyzed according to a time domain. A plurality of delay signals may be generated by delaying a signal of the time domain by a certain period at a time. A degree of matching may be determined by matching the signal of the time domain with each delay signal. It may be determined whether a white noise is occurred based on the degree of matching. A status of occurrence of the white noise may be output.

The determining of occurrence of white noise based on the degree of matching may include calculating an auto-correlation coefficient that corresponds to a degree of matching between the signal of the time domain and each delay signal, dividing each auto-correlation coefficient according to the number of delayed periods of the delay signal matched to the signal of the time domain and determining whether a white noise is occurred based on the auto-correlation coefficient divided.

The determining of whether the white noise is occurred based on the degree of matching may include comparing consecutive auto-correlation coefficients, and may determine of a defect by an occurrence of a white noise if one of the consecutive auto-correlation coefficients is greater than the other auto-correlation coefficient by a certain value or above.

The method may further include determining of a sound volume of the measured test sound as a sound volume in decibel units based on the measured test sound, and displaying the sound volume determined in decibel units.

The method may further include comparing a standard sound volume with the sound volume determined in decibel units, and may indicate a defect of the sound volume if the determined sound volume in decibel units exceeds the standard sound volume.

The method may further include determining a sound volume of the measured test sound as a sound volume in decibel units based on a signal of the measured test sound, dividing the sound volume in decibel units into a plurality of sections according to a time, calculating a rate of difference between a minimum value of the sound volume and a maximum value of the sound volume at each section, and indicating the rate of the each section calculated.

The method may further include comparing the rate of each section with a certain rate, determining of a defect by an occurrence of a broken sound if a section having a rate less than the certain rate exists among the plurality of sections; and indicating the defect by occurrence of the broken sound.

The method may further include halting an generation of an original sound upon a request for a mute sound test is made, measuring a test sound generated through a subject of sound quality evaluation, determining whether a signal of the test sound measured at the time of the original sound generation is halted is within a range allowed, determining of an occurrence of a white noise in a state of a mute sound if the signal of the test sound measured is out of the range allowed, and indicating as a defect by an occurrence of a noise in a state of the mute sound.

The method may further include analyzing the signal of the test sound measured according to a frequency domain, determining a degree of occurrence of a buzz and rattle based on a size of a plurality of Harmonics corresponding to a fundamental frequency within the frequency domain; and indicating a degree of occurrence of the buzz and rattle generated from the subject of sound quality evaluation.

The determining of the degree of occurrence of the buzz and rattle based on the size of the plurality of the Harmonics includes calculating an average size of surrounding frequencies for each Harmonic, calculating each Peak by deducting the average size of the surrounding frequencies from a size of each Harmonic according to each Harmonic and calculating a Peak Sum by adding each Peak; and determining a degree of occurrence of the buzz and rattle based on the Peak Sum calculated.

The method may further includes determining occurrence of the buzz and rattle if the Peak Sum calculated exceeds a standard Peak Sum.

The method may further includes checking a center frequency of the frequency domain, determining whether a sound tone is normal by comparing the center frequency checked with a frequency of the original frequency; and indicating a status whether the sound tone is normal.

In accordance with an aspect of one or more embodiments, there is provided an apparatus for evaluating a sound quality of a subject of sound quality evaluation and outputting an original sound stored in advance as a test sound, the apparatus includes a test sound measuring unit, an analyzing unit, a determining unit, a controlling unit and a reporting unit. The test sound measuring unit may be configured to measure a test sound generated from the subject of sound quality evaluation. The analyzing unit is configured to analyze a signal of the measured test sound according to a time domain and according to a frequency domain. The determining unit may be configured to determine a degree of a buzz and rattle occurred based on a plurality of Harmonics corresponding to a fundamental frequency within the frequency domain, to calculate an auto-correlation coefficient with reference to a signal of the time domain, and to determine whether a white noise is occurred based on the auto-correlation coefficient calculated. The controlling unit may be configured to control such that a degree of occurrence of the buzz and rattle and a status of whether a white noise is occurred are output. The reporting unit may be configured to output the degree of the occurrence of the buzz and rattle and the status of occurrence of the white noise generated from the subject of sound quality evaluation.

The determining unit may calculate an average size of surrounding frequencies by each Harmonic, may calculate each Peak by deducting the average size of the surrounding frequencies from a size of each Harmonic, calculates a Peak Sum by adding each Peak, and may determine the degree of occurrence of the buzz and rattle based on the Peak Sum calculated.

The determining unit may determine a sound volume of the measured test sound as a sound volume in decibel units based on a signal of the measured test sound.

The determining unit may check a center frequency of the frequency domain, and determines whether a sound tone is normal by comparing a frequency of the original sound with the checked center frequency.

The determining unit may measure a test sound generated from the subject of sound quality evaluation when a test sound with reference to a mute sound is generated, and may determine whether a noise is occurred at a state of a mute sound by determining if a signal of the measured test sound is within a range allowed.

The determining unit may determine a sound volume of the measured test sound as a sound value in decibel units based on a signal of the measured test sound, and may determine whether a broken sound is occurred by comparing a minimum value of the sound volume with a maximum value of the sound volume determined in decibel units.

The determining unit may generate a plurality of delay signals by delaying a signal of the time domain by a certain period at a time, may compare a first auto-correlation coefficient which is calculated by comparing a first delay signal of the plurality of delay signals with the signal of the time domain, with a second auto-correlation coefficient which is calculated by comparing a second delay signal that is delayed by one period than the first delay signal with the signal of the time domain; and may determine a defect by an occurrence of a white noise if the second auto-correlation coefficient is greater than the first auto-correlation coefficient.

As described above, an automated sound quality evaluation may be realized at a production/manufacturing site without having to establish a dead-sound chamber condition, thereby able to reduce spatial/cost investments needed to establish a dead-sound chamber condition, as well as an occurrence of an industrial accident.

In addition, once performed based on a subjective decision of a worker, a sound quality evaluation may be performed in a form of a quantitative process of a sound quality evaluation, thereby able to precisely grasp a cause of a defect, and conveniently recognize a degree of defect by displaying the degree of defect in numeric figures.

In accordance with an aspect of one or more embodiments, there is provided a method of evaluating sound quality including generating an original sound; measuring a test sound generated from a subject of sound quality evaluation; analyzing, using at least one processor, the measured test sound according to a frequency domain; determining a degree of occurrence of a buzz and rattle occurred based on a plurality of Harmonics corresponding to a fundamental frequency in the frequency domain; controlling an occurrence of the original sound; and outputting the degree of occurrence of the buzz and rattle.

According to another aspect of one or more embodiments, there is provided at least one non-transitory computer readable medium storing computer readable instructions to implement methods of one or more embodiments.

In as aspect of one or more embodiments, when a generating status of a sound from a sound generating apparatus is defective, a cause of a defect may be easily determined, and a prompt response to the cause of a defect may be placed.

BRIEF DESCRIPTION OF THE DRAWINGS

These and/or other aspects will become apparent and more readily appreciated from the following description of embodiments, taken in conjunction with the accompanying drawings of which:

FIGS. 6, 7A, and 7B are views illustrating a white noise test of the sound quality evaluation method according to an embodiment;

DETAILED DESCRIPTION

Figure 1:
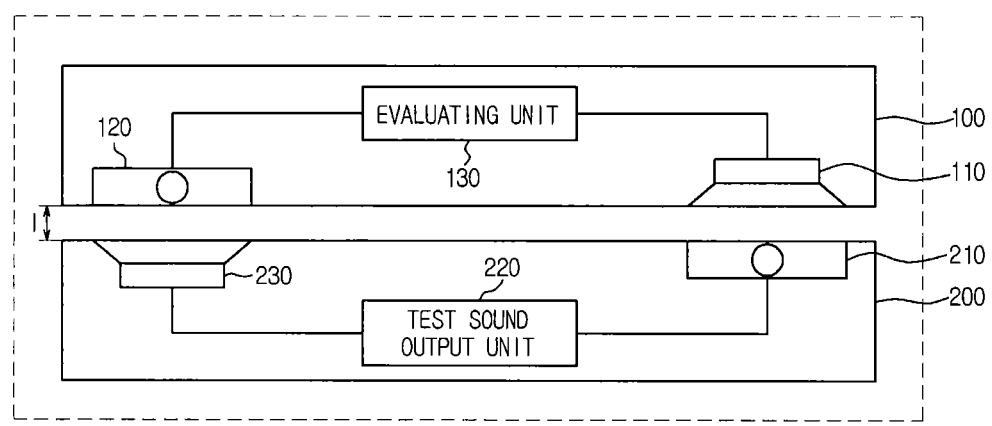
FIG. 1 is a structural view of a sound quality evaluation apparatus according to an embodiment.

Reference will now be made in detail to embodiments, examples of which are illustrated in the accompanying drawings, wherein like reference numerals refer to like elements throughout.

Figure 2:
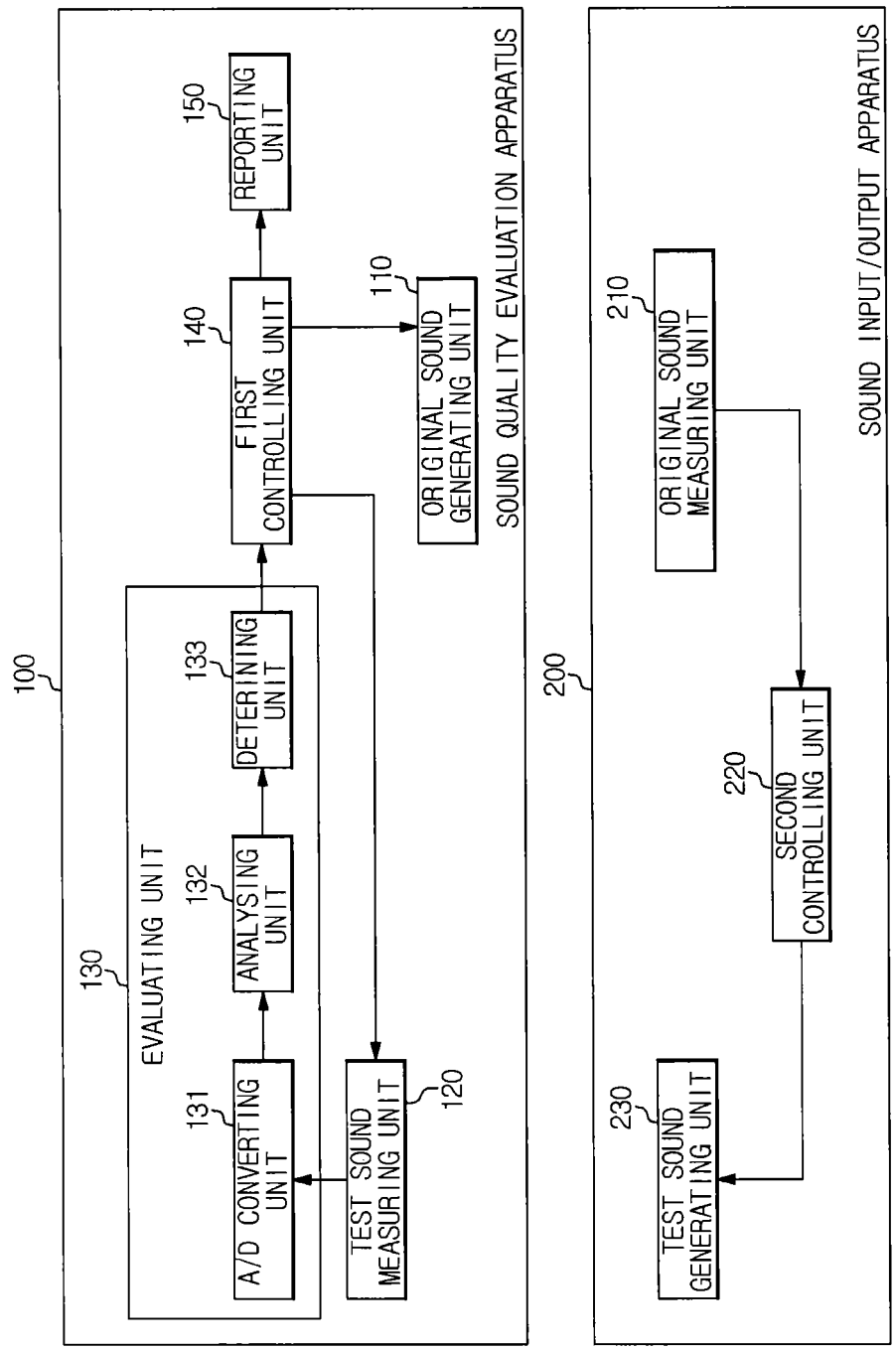
FIG. 2 is a detailed structural view of the sound quality evaluation apparatus according to embodiment.

FIG. 1 is a structural view of a sound quality evaluation apparatus according to an embodiment. FIG. 2 is a detailed structural view of the sound quality evaluation apparatus according to an embodiment.

A sound quality evaluation apparatus 100 according to an embodiment evaluates a sound quality of a sound input/output apparatus at a production/manufacturing line, a sound input/output apparatus at a development stage, and a sound input/output apparatus of a finished product. That is, the sound quality evaluation apparatus 100 may evaluate a sound quality of a sound input/output apparatus at a place other than in a dead-sound chamber.

A sound quality evaluation apparatus 100 is provided separately from a sound input/output apparatus 200 which represents a subject of a sound quality evaluation.

That is, the sound quality evaluation apparatus 100 measures a test sound of the sound input/output apparatus 200 from a location spaced apart by a certain distance I from the sound input/output apparatus 200, and evaluates the sound quality of a test sound output from the sound input/output apparatus 200.

As illustrated on FIG. 1 and FIG. 2, the sound quality evaluation apparatus 100 includes an original sound generating unit 110, a test sound measuring unit 120, an evaluating unit 130, a first controlling unit 140, and a reporting unit 150.

The original sound generating unit 110 generates a sound corresponding to an original sound toward the sound input/output apparatus 200 for a certain period of time according to a command of the first controlling unit 140.

The original sound generating unit 110 includes a speaker configured to output a sound wave into an air after converting an original sound of an electrical signal to a vibration of a diaphragm, and a receiver configured to convert an electrical vibration, which is generated by a change of a direction and a size of an electrical signal, to a sound vibration. A speaker or a receiver maintains a certain distance I from an original sound measuring unit 210 of the sound input/output apparatus 200.

That is, since an output of an original sound generating unit 100 is very small, a certain distance is maintained, that is, as nearly attached as possible, between the original sound generating unit 110 and an original sound measuring unit 210.

The test sound measuring unit 120 is positioned near a test sound output unit 230 of the sound input/output apparatus 200, and measures a test sound generated through the test sound output unit 230 and converts a sound wave of a test sound measured to an electrical signal.

At this time, the test sound measured includes an original sound, distortion at a sound input/output apparatus, and noise.

The test sound measuring unit 120 includes a microphone configured to generate an electrical signal according to a vibration of a sound wave received, and a microphone maintains a certain distance I from the test sound output unit 230 of the sound input/output apparatus 200.

That is, since an output of a test sound output unit 230 is very small, a certain distance is maintained, that is, as nearly attached as possible, between the test sound output unit 230 and the test sound measuring unit 120.

A microphone uses an unidirectional microphone, thereby minimizing an effect of a surrounding noise.

The evaluating unit 130 evaluates a sound quality of a sound input/output apparatus based on the test sound measured. A sound quality is evaluated based on a white noise, a broken sound, a degree of occurrence of a buzz and rattle, a degree of noise occurred in a state of a mute sound, a sound volume, and a sound tone of a test sound.

The first controlling unit 140 controls an operation of the original sound generating unit 110 and the test sound measuring unit 120 upon a command to evaluate a sound quality of the sound input/output apparatus 200 is entered through an entry unit (not shown) or a communicating unit (not shown) outside.

The first controlling unit 140 stores information on an original sound having about 100 Hz to 2000 Hz in frequencies.

The first controlling unit 140 controls an operation of the reporting unit 150, upon information of sound quality evaluated is entered from the evaluating unit 130, so that the information on the sound quality of the speaker input/output apparatus 200 may be output.

The reporting unit 140 outputs information on sound quality evaluation of the sound input/output apparatus 200.

The reporting unit 150 outputs a degree of occurrence of a buzz and rattle, a degree of occurrence of a white noise, a rate of a sound volume of a broken sound, and a sound volume in numeric figures, and also outputs a status whether a broken sound is normal, whether a sound volume is normal, whether a sound tone is normal, whether a noise occurs in a state of a mute sound, whether a white noise is normal, and whether a buzz and rattle is normal.

A reporting unit includes a displaying unit and communicating unit.

That is, the reporting unit 150 includes a displaying unit which directly displays information on sound quality evaluation of the sound input/output apparatus 200, or includes a communicating unit which sends information on sound quality evaluation of the sound input/output apparatus 200 to an outside apparatus.

In addition, the sound quality evaluation apparatus 100 may quantify sound quality evaluation categories according to each sound input/output apparatus, and store and manage a numeric figure with reference to each category.

On FIG. 2, the following description will be made in detail with reference to the evaluating unit 130.

As illustrated on FIG. 2, the evaluating unit 130 includes an A/D converting unit 131, an analyzing unit 132, and a determining unit 133.

The A/D converting unit 131 converts a signal of a test sound measured to a digital signal.

The signal of a test sound measured through the test sound measuring unit 120 is an analog signal.

The analyzing unit 132 analyzes a digital signal according to a frequency domain and according to a time domain. The analyzing unit 132 may use FFT (Fast Fourier Transform) to analyze a frequency domain.

In addition, an analog signal and a digital signal are already analyzed according a time domain, and therefore, a time domain analysis is not needed.

The determining unit 133 determines a degree of occurrence of a buzz and rattle based on a signal of a frequency domain, and also determines a degree of occurrence of a white noise, a rate of a sound volume of a broken sound, and a sound volume based on a signal of a time domain.

The determining unit 133 determines whether a sound tone and a buzz and rattle are normal based on a signal of a frequency domain, and also determines whether a sound volume is normal, and whether a white noise, a broken sound, and a noise in a state of a mute sound are occurred, based on a signal of a time domain.

The following description will be made further in detail with reference to the determining unit 133.

The determining unit 133 determines a fundamental frequency within a frequency domain and a plurality of Harmonics corresponding to the fundamental frequency, calculates each Peak by subtracting an average size of surrounding frequencies of a corresponding Harmonic from a size of each Harmonic, calculates a Peak Sum by summing up each Peak, and determines a degree of occurrence of a buzz and rattle based on the Peak Sum calculated.

At this time, the determining unit 133 determines that a buzz and rattle is occurred if the Peak Sum calculated exceeds a standard Peak Sum.

In addition, the determining unit 133 may determine whether an irregular buzz and rattle has occurred by comparing Peaks corresponding consecutive Harmonics, and if a Peak of a Harmonic having a higher integral multiple is great than a Peak of a Harmonic having a lower integral multiple.

Also in addition, when calculating a Peak Sum, a Peak with reference to a fundamental frequency may be calculated by subtracting an average size of surrounding frequencies of the fundamental frequency from a size of the fundamental frequency, and by summing up a Peak with reference to a fundamental frequency with Peaks with reference to a plurality of Harmonics.

The determining unit 133 checks a center frequency of a frequency domain, and determines whether a sound tone is normal by comparing the center frequency checked with a frequency of an original sound.

The determining unit 133 determines a sound volume of the test sound measured in decibel units based on a signal of the test sound measured. At this time, the determining unit 133 determines a sound volume in decibel units according to a time domain.

The determining unit 133 determines a sound volume of the test sound measured in decibel units and according to a time domain based on a signal of the test sound measured, and also determines whether a broken sound is occurred by comparing the minimum value and the maximum value of the sound volume determined in decibel units.

In addition, in determining whether a broken sound has occurred, the determining unit 133 may divide the time domain at the time of when a test sound is measured into a plurality of sections, and calculate a rate of a difference of the minimum sound volume and the maximum sound volume of each section.

The determining unit 133 measures a test sound which is output with reference to a mute sound from a sound input/output apparatus 200, and determines whether a noise is occurred in a state of a mute sound by determining if a signal of the test sound measured is within a range allowed.

The determining unit 133 calculates an auto-correlation coefficient with reference to a signal of a time domain, and determines whether a white noise is occurred based on the auto-correlation coefficient calculated.

Further, the determining unit 133 generates a plurality of delay signals that are each delayed from a signal of a time domain by a certain period, calculates each auto-correlation coefficient by comparing the signal of a time domain with each delay signal, and determines whether a white noise is occurred based on a change of each consecutive auto-correlation coefficient.

Calculating each auto-correlation coefficient by comparing the signal of a time domain with each delay signal representing determining a degree of matching between the signal of a time domain and a delay signal.

That is, a first auto-correlation coefficient is calculated by comparing a first delay signal with the signal of a time domain, and a second auto-correlation coefficient is calculated by comparing a second delay signal that is delayed by one period than the first delay signal with the signal of a time domain. A defect by an occurrence of a white noise is determined if the second auto-correlation coefficient is greater or less than the first auto-correlation coefficient by a certain value or above.

The sound quality evaluation with reference to the sound generated from the sound input/output apparatus 200 may be performed without an effect of a surrounding noise at a place other than in a dead-sound chamber, and may reduce an occurrence of an industrial accident.

In addition, when a sound quality is found to be defective, a cause of the defect may be easily determined, and a prompt response to the cause of a defect may be placed.

The sound input/output apparatus 200 is a device which is evaluated with reference to a sound quality in a state of a finished product, in a half finished state at a production/manufacturing line or a development state, and is shipped only when a sound quality is determined as normal.

A sound input/output apparatus 200 is a device which may input and output a sound, and includes a notebook, a mobile terminal such as a portable phone, an audio device having a microphone, a home theatre system, a camera, a camcorder, and MP3 device.

The sound input/output apparatus 200 includes the sound measuring unit 210, a second controlling unit 220, and the test sound output unit 230.

The original sound measuring unit 210 is positioned near the original sound generating unit 110 of the sound quality evaluation apparatus 100, and measures the original sound generated through the original sound generating unit 110 and converts a sound wave of the original sound measured to an electrical signal.

The original sound measuring unit 210 includes a microphone configured to receive a sound wave and generates an electrical signal according to the vibration of the sound wave received.

A microphone uses an unidirectional microphone, thereby minimizing an effect of a surrounding noise.

The second controlling unit 220 controls an operation of the original sound measuring unit 210 and the test sound output unit 230 upon a command to evaluate a sound quality is input through an entry unit (not shown) or a communicating unit (not shown).

The second controlling unit 220 controls an operation of the test sound output unit 230, thereby enabling a sound corresponding to an original sound to be output.

A second controlling unit 220 includes a Loop Back program which enables a sound corresponding to the original sound measured to be output through the test sound output unit 230.

In addition, a sound corresponding to the original sound measured by recording and replaying such original sound measured may be output through the test sound output unit 230.

The original sound generated through a Loop Back program or a recording/replaying is output to the test sound output unit 230 via a codec.

The test sound output unit 230 outputs an original sound according to a command of the second controlling unit 220.

At this time, a distortion and a noise are mixed with the original sound which is output through the test sound output unit 230.

That is, an original sound which is intended to be output by the sound input/output apparatus 200 is output as a test sound mixed with a noise according to a defective status or a normalcy of the sound input/output apparatus 200.

The test sound output unit 230 includes a speaker configured to output a sound wave into an air after converting an original sound of an electrical signal to a vibration of a diaphragm, and a receiver configured to convert an electrical vibration, which is generated by a change of a direction and a size of an electrical signal, to a sound vibration. A speaker or a receiver maintains a certain distance I from the test sound measuring unit 120 of the sound quality evaluation apparatus 100. A certain distance is the distance such that the test sound measuring unit 120 and a test sound output unit 230 are positioned as nearly attached as possible.

Figure 3:
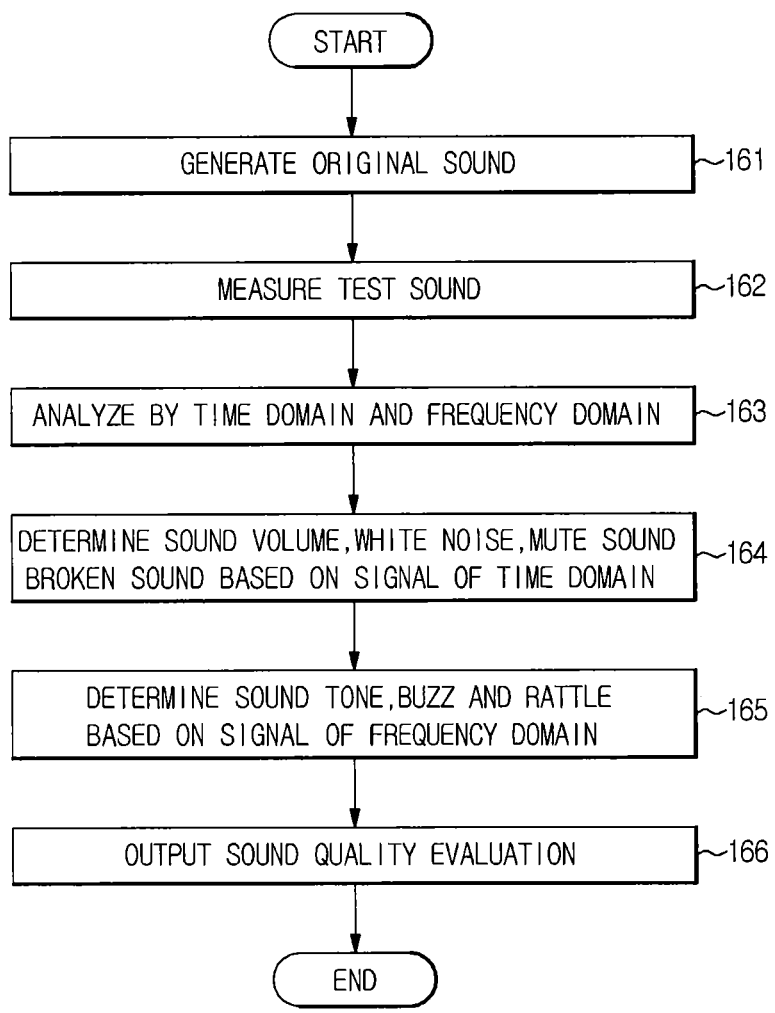
FIG. 3 is a flow chart of a sound quality evaluation method according to an embodiment.

FIG. 3 is a flow chart of a sound quality evaluation method according to an embodiment, and will be explained by referring FIG. 1 and FIG. 2.

First, the sound input/output apparatus 200, which is a subject of a sound quality evaluation, is placed near the sound quality evaluation apparatus 100.

Then, the sound quality evaluation apparatus 100 and the sound input/output apparatus 200 are operated.

Next, a pre-stored original sound is generated (161) by the sound quality evaluation apparatus 100. An original sound is a sound used to evaluate a sound quality of the sound input/output apparatus 200, and corresponds to a Sinusoidal Wave having about 100 Hz to 2000 Hz in frequencies.

The sound input/output apparatus 200 measures the original sound generated from the sound quality evaluation apparatus 100, replays the original sound generated, which is measured through a Loop Back program, and outputs to outside.

At this time, the sound input/output apparatus 200 outputs a test sound mixed with an original sound, a partially distorted sound according to a sound output status of the sound input/output apparatus 200, and a noise.

That is, the sound quality evaluation apparatus 100 measures (162) the test sound output through the sound input/output apparatus 200, converts a signal of the test sound measured to a digital signal, and analyzes (163) the digital signal converted by a frequency domain and a time domain.

Next, the sound quality evaluation apparatus 100 determines (164) whether a white noise, a mute sound, and a broken sound are normal by performing a sound volume test, a white noise test, a mute sound test, and a broken sound test based on a signal of a time domain, determines (165) whether a sound tone and a buzz and rattle are normal by performing a sound tone test and a buzz and rattle test based on a signal of a frequency domain, evaluates a sound quality of the sound input/output apparatus 200 based on whether a sound volume, a white noise, a mute sound, a broken sound, a sound tone, and a buzz and rattle are normal, and outputs (166) the information on a sound quality evaluation.

The outputting of the information on a sound quality evaluation includes displaying the information on a sound quality evaluation through a reporting unit which is provided at the sound quality evaluation apparatus 100, or sending the information on a sound quality evaluation to an external display apparatus so that such information may be displayed through the external display apparatus.

By referring to FIG. 4 to FIG. 8, evaluating a sound quality of the sound input/output apparatus 200 will be further explained in more detail.

(1) Sound Volume Test

A sound volume test is a test performed based on a size of a signal of the test sound measured.

The sound quality evaluation apparatus calculates a RMS (Root Mean Square) value from a signal of a test sound of the time domain collected in mV units, converts the RMS value calculated in decibel units, which is a Log Scale, in order to convert a sound volume into numeric figures, and determines whether a sound volume is normal based on the sound volume in decibel units.

The sound quality evaluation apparatus compares a standard sound quality with the sound volume calculated in decibel units, and determines a defect by a no sound if the sound volume calculated in decibel units is out of the range of a standard volume.

That is, since a unit of a size of a sound for a human being to recognize is in decibel units, a sound volume is converted in numeric figures in decibel units to represent an auditory sense of a human being.

(2) Mute Sound Test

If a problem occurs on a circuit inside a sound input/output apparatus, a noise, which is different from a white noise, is generated at a sound input/output apparatus. If this noise is not being detected by a white noise test, a mute sound test may be performed.

That is, a mute sound test conducts a test whether a sound is generated in a certain period of time when no sound is input in a state a Loop Back program is being activated inside a sound input/output apparatus.

Figure 4:
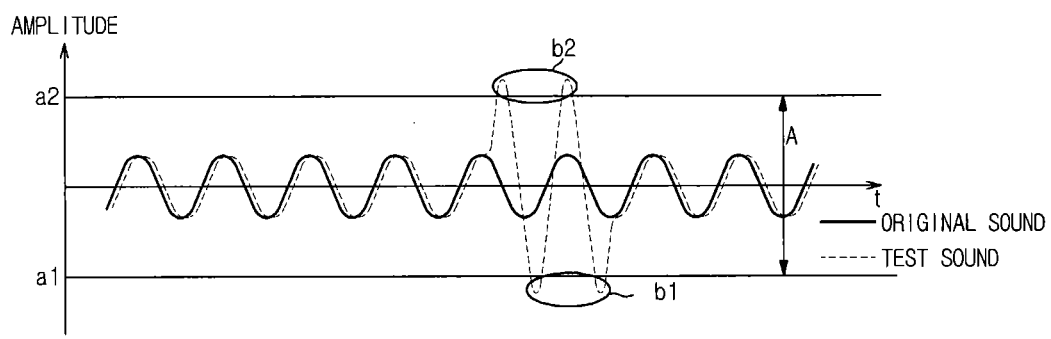
FIG. 4 is a view illustrating a mute sound test of the sound quality evaluation method according to embodiment.

As illustrated on FIG. 4, a noise is determined to occur in a mute sound test if signals b1 and b2, among signals of test sound analyzed by a time domain, exists out of a range A allowed between a first allowed value a1 and a second allowed value a2.

A noise is determined not to occur as a result of a circuit, etc. if all signal of the test sound analyzed by a time domain is within the range allowed between the first allowed value a1 and the second allowed value a2.

The amplitude has a sound volume in decibel units.

That is, defect by a noise is determined to occur if a sound volume, among the sound volume in decibel units analyzed by a time domain, exists out of the allowed range in a mute sound test.

(3) Broken Sound Test

A broken sound test is performed to examine a change of a sound volume while a test sound is output, and to examine a phenomenon of a broken sound while a sound source is replayed for a certain period of time.

Figure 5A:
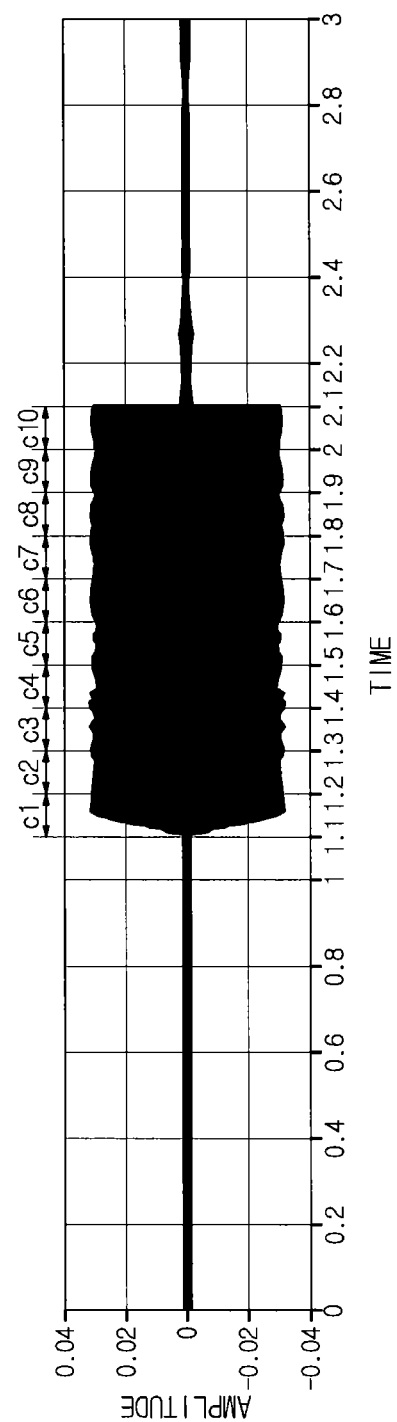
FIGS. 5A and 5B are views illustrating a broken sound test of the sound quality evaluation method according to embodiment.

As illustrated in FIG. 5A, if a phenomenon of a broken sound does not occur while a sound is replayed for a certain period of time, a size of a signal of a test sound between each section from $c1$ to $c10$, that is, from the start of replay of sound to the ending, is maintained at a stable manner without changing.

Figure 5B:
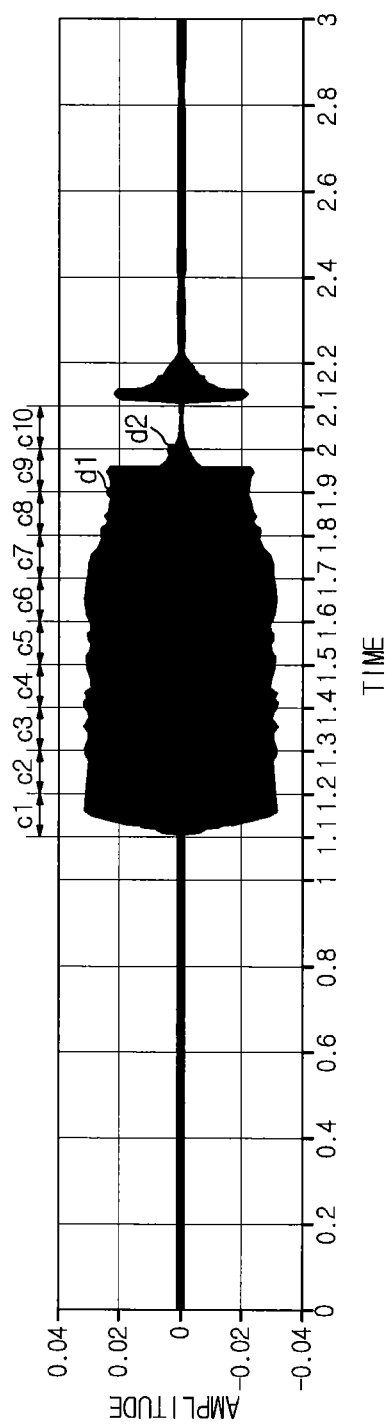

As illustrated in FIG. 5B, if a phenomenon of a broken sound occurs while a sound source is replayed for a certain period of time, a section where a size of a signal of a test sound is reduced is created.

As illustrated in FIG. 5B, in order to determine a defect caused by a broken sound, a time domain is divided into 10 sections from $c1$ to $c10$, and a rate of the difference between a maximum value AMPMax and a minimum value AMPMin by each section is calculated and is converted to AMP GAP format.

A sound quality evaluation apparatus compares a standard rate with a rate of each section calculated, and determines a defect caused by an occurrence of a broken sound if a section having a rate less than the standard rate exists.

The amplitude may have a sound volume in decibel units.

In addition, the standard rate may be adjusted according to a specific character of a sound input/output apparatus and a test condition, thereby able to adjust a false defect and detectability.

(4) White Noise Test

A white noise is a phenomenon of a noise element being mixed throughout entire frequency domain due to a circuit problem inside a sound input/output apparatus, and since a defect does not appear in a specific frequency element, a white noise test is not a suitable for testing with a frequency domain analysis.

Therefore, a white noise test uses NAPS (Negative Auto-Correlation Coefficient Peak Slope) corresponding to a change of an auto-correlation coefficient in order to examine whether a white noise is occurred.

More in detail, as illustrated on FIG. 6, an initial signal a of the test sound analyzed by a time domain is checked, and generates a plurality of delay signals from b to e by delaying the signal of a test sound by one period.

A degree of matching between an initial signal a of a test sound by matching each of an initial signal a of a test sound and a plurality of delay signals from b to e. A degree of matching is calculated by period, and an auto-correlation coefficient is calculated by summing up the degree of matching of each period.

That is, a first auto-correlation coefficient is calculated by matching a first delay signal b, which is delayed by one period, at an initial signal a of the test sound; a second auto-correlation coefficient is calculated by matching a second delay signal c, which is delayed by two periods, at the initial signal a of the test sound; a third auto-correlation coefficient is calculated by matching a third delay signal d, which is delayed by three periods, at the initial signal a of the test sound; and a fourth auto-correlation coefficient is calculated by matching a fourth delay signal e, which is delayed by four periods, at the initial signal a of the test sound.

At this time, a matching is performed as many as the number calculated by deducting one period from a total number of periods of an initial signal of a test sound, and an auto-correlation coefficient is calculated by the number of matching occurrence between the initial signal and the delay signal.

Figure 7A:
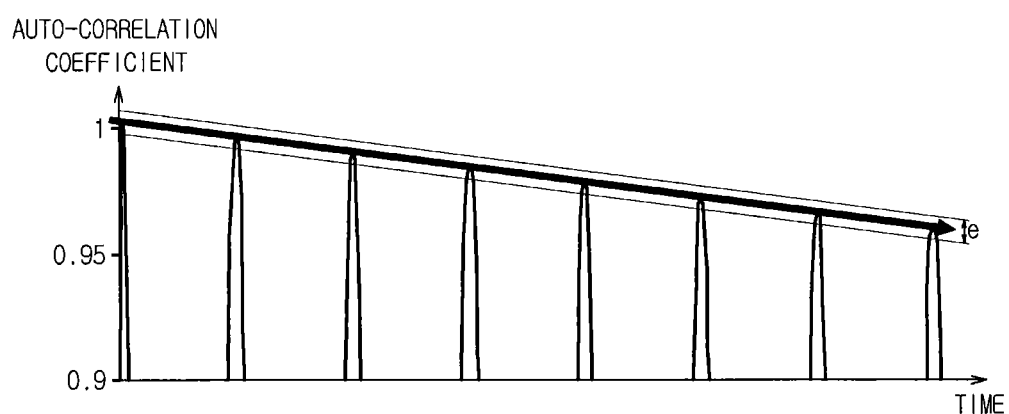

A formula to describe the above is as follows:

FIG. 7A is a graph showing a change in an auto-correlation coefficient when a white noise is not occurred, and the auto-correlation coefficient is reduced at a constant degree within a certain range e as a delay signal, which matches with an initial signal of a test sound, is delayed by one period at a time.

That is, by delaying a period of a delay signal by one period at a time, the period which matches with an initial signal of a test sound reduces by one period. Accordingly, the number of periods needed to calculate a degree of matching is reduced, so that an auto-correlation coefficient is reduced.

Figure 7B:
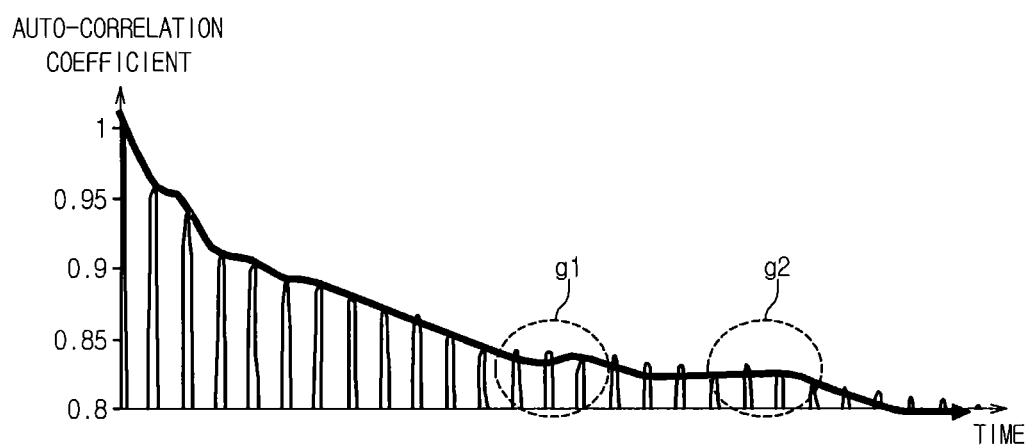

FIG. 7B is a graph showing a change in an auto-correlation coefficient when a white noise is occurred, and the auto-correlation coefficient is irregularly reduced or increased $g2$, $g1$ as a signal of a test sound is distorted by a white noise.

That is, in order to determine an irregular increase of a reduction of an auto-correlation coefficient, a first auto-correlation coefficient which is calculated as a degree of matching between a first delay signal, which is a delay signal, and a signal of a test sound, which is a signal of a time domain, is compared with a second auto-correlation coefficient which is calculated as a degree of matching between a second delay signal which is delayed by one period than the first delay signal and the signal of the test sound.

At this time, a defect by an occurrence of a white noise is determined if the second auto-correlation coefficient is greater than the first auto-correlation coefficient by a certain value or above. In addition, a defect by an occurrence of a white noise may be determined if the second auto-correlation coefficient is less than the first auto-correlation coefficient by a certain value or above.

(5) Sound Tone Test

A sound tone test is performed to examine a degree of distortion while a signal of a test sound is generated at a sound input/output apparatus.

A sound quality evaluation apparatus determines whether a matching is occurred by comparing a frequency of a signal of an original sound with a center frequency of a signal of a test sound measured. A sound quality evaluation apparatus then determines that a sound tone is normal if a frequency of a signal of an original sound matches with a center frequency of a signal of a test sound, or that a sound tone is defective if a frequency of a signal of an original sound does not match with a center frequency of a signal of a test sound.

In addition, the reason for comparing a center frequency of a test sound measured is because a signal of a test sound is distorted while being output from a sound input/output apparatus and thus sound having different frequencies mixed with respect to a center frequency is measured For an example, a sound tone is normal if a frequency of an original sound is 1000 Hz while the frequencies of a test sound measured are 960 Hz, 970 Hz, 990 Hz, 1000 Hz, 1010 Hz, 1020 Hz, 1030 Hz, and 1040 Hz, and a sound tone is defective if a frequency of an original sound is 1100 Hz while the frequencies of a test sound measured are 960 Hz, 970 Hz, 990 Hz, 1000 Hz, 1010 Hz, 1020 Hz, 1030 Hz, and 1040 Hz.

When determining whether a frequency of an original sound and a center frequency of a test sound match, a certain margin of error may be allowed.

(6) Buzz and Rattle Test

A buzz and rattle test is performed to examine an irregular buzz and rattle.

An irregular buzz and rattle has occurred when an apparatus defect of a microphone or a speaker of a sound input/output apparatus has occurred, or an assembly defect has occurred.

A buzz and rattle test is described hereafter.

Figure 8A:
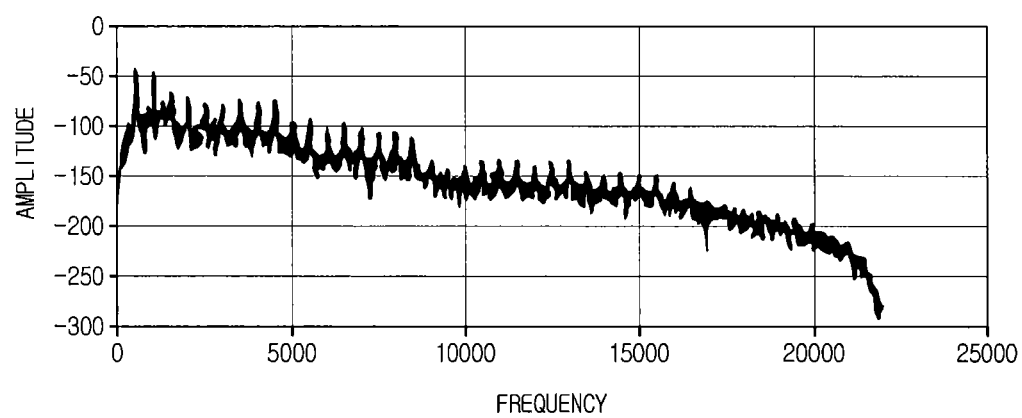
FIGS. 8A and 8B are views illustrating a buzz and rattle test of the sound quality evaluation method according to an embodiment.

FIG. 8A is a graph showing a frequency domain, and a fundamental frequency is determined at a signal of a frequency domain, and a plurality of Harmonics which corresponds to the fundamental frequency is extracted. The plurality of Harmonics may each have different integer multiples.

Figure 8B:
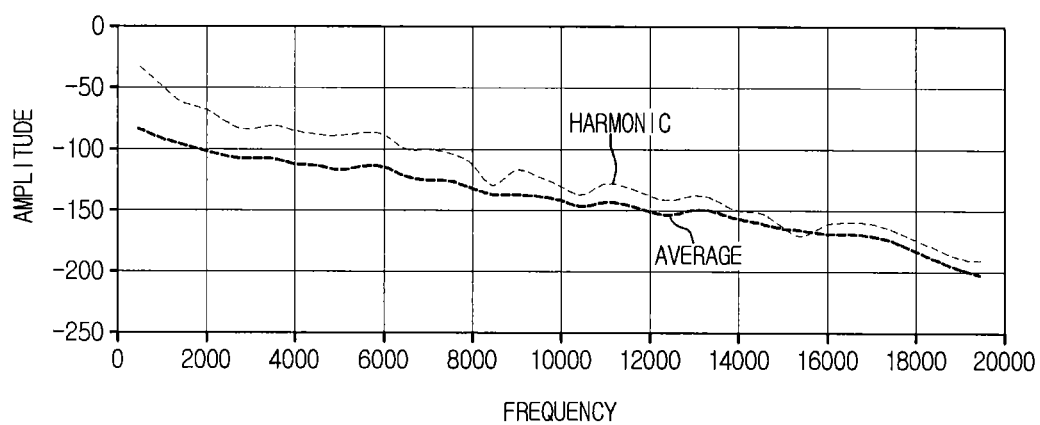

As illustrated in FIG. 8B, an average size VMean is calculated by averaging the sizes of surrounding frequencies of aHarmonic, and a Peak is calculated by subtracting the VMean calculated from the size VPeak of the Harmonic. Calculating a Peak is performed with reference to each of the plurality of Harmonics.

The size is a sound volume in decibel units.

Also, by summing up a plurality of Peaks to calculate a Peak Sum, a degree of occurrence of buzz and rattle is generated in numeric figures.

A Peak Sum may be calculated by summing up a Peak with reference to a fundamental frequency with Peaks with reference to a plurality of Harmonics, and also by summing up Peaks with reference to some Harmonics among a plurality of Harmonics.

Also, the calculated Peak Sum (Peak Sum calculated) is compared with a standard Peak Sum and if the calculated Peak Sum exceeds the standard Peak Sum, a defect by an occurrence of a buzz and rattle is determined.

In addition, when an irregular buzz and rattle has occurred, a size of a Harmonic having a higher integer multiple is relatively increased than a size of a Harmonic having a lower integer multiple.

Accordingly, if a Peak with reference to a second Harmonic which has a higher integer multiple than a first Harmonic is larger than a Peak with reference to the first Harmonic, a defect by an occurrence of a buzz and rattle may be determined.

As an occurrence of a buzz and rattle is converted into numeric figures, a distortion due to an absolute size of a signal of a test sound measured, or a distortion due to a difference in a characteristic of a frequency according to a model of a sound input/output apparatus may be prevented.

In addition, a distortion by Harmonic having a lower integer multiple which may be increased due to a characteristic of a codec of a sound input/output apparatus may be prevented. A defect or a normality may be determined under a noise condition such as a production/manufacturing process, or without having to have a separate dead-sound condition.

By providing an objective figure after quantitatively categorizing a measured value for evaluating a sound quality, a defective category and a degree of defect may be easily determined, and a prompt response to the cause of a defect may be placed by a worker.

By managing a figure with reference to each category after quantitatively categorizing a sound quality evaluation, a uniformed quality may be retained. Also, since an evaluation of a sound quality is performed automatically, an omission of a test may be prevented.

The time input for evaluating a sound quality of a sound input/output apparatus may be reduced, thereby able to improve productivity by about 5% to 12%.

Also, a fatigue of a worker may be reduced through an automated process of a sound quality evaluation.

In addition, through new categories such as a Peak Sum and NAPS, a sound quality evaluation may be performed under a general condition other than a dead-sound condition. Through such, a defect may be determined under a noise condition such as a production/manufacturing process, and a lot test may be performed on all products, thereby able to contribute largely to a quality assurance.

Figure 9:
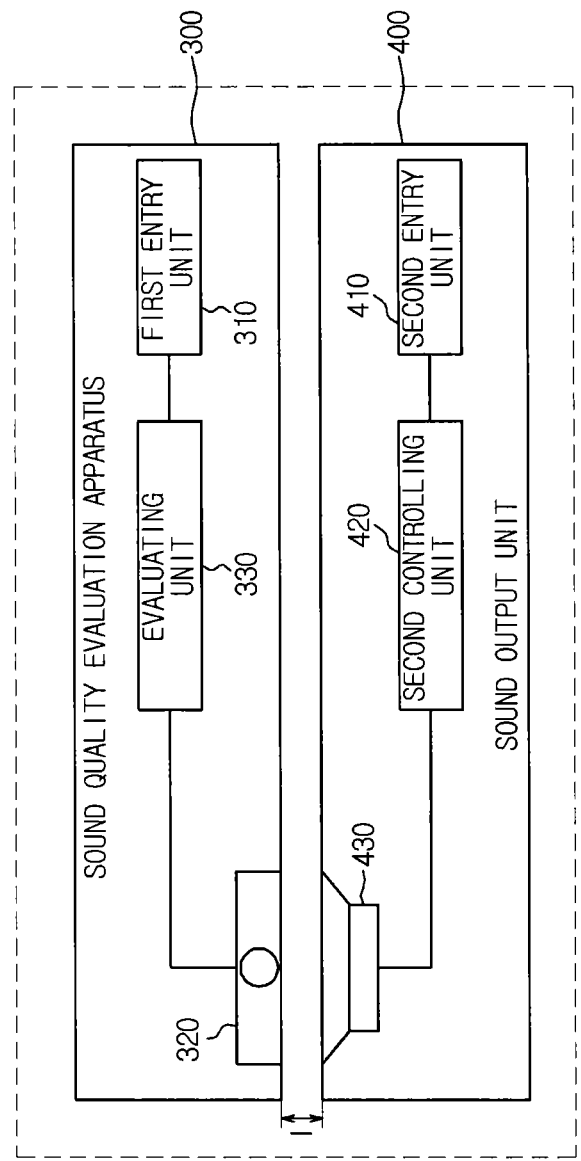
FIG. 9 is a structural view of a sound quality evaluation apparatus according to an embodiment.
Figure 10:
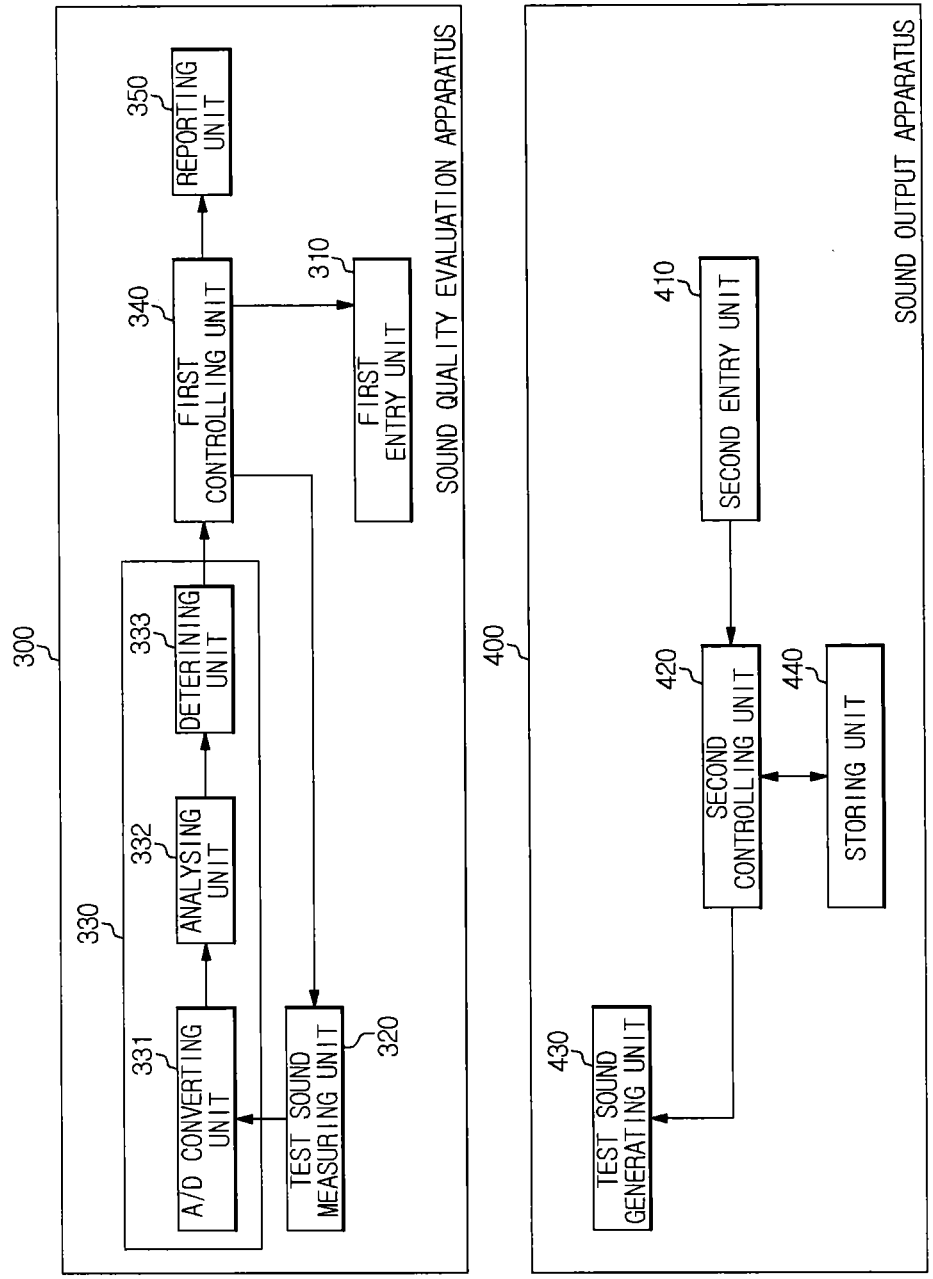
FIG. 10 is a detailed structural view of the sound quality evaluation apparatus of FIG. 9.

FIG. 9 is a structural view of a sound quality evaluation apparatus according to an embodiment. FIG. 10 is a detailed structural view of the sound quality evaluation apparatus of FIG. 9.

A sound quality evaluation apparatus 300, according to an embodiment, evaluates a sound quality of a sound output apparatus at a manufacturing/production line, and a sound output apparatus at a development stage and a sound output apparatus of a finished product. As such, the sound quality evaluation apparatus 300 may evaluate a sound quality of a sound output apparatus 400 at a place other than a dead-sound chamber.

Such a sound quality evaluation apparatus 300 is provided separately from the sound output apparatus 400.

That is, the sound quality evaluation apparatus 300 measures a test sound of the sound output apparatus 400 from a location spaced apart by a certain distance I from the sound output apparatus 400 which is a subject of a sound quality evaluation, and evaluates the sound quality of a sound generated from the sound output apparatus 400.

As illustrated on FIG. 9 and FIG. 10, the sound quality evaluation apparatus 300 includes a first entry unit 310, a test sound measuring unit 320, an evaluating unit 330, a first controlling unit 340, and a reporting unit 350.

The first entry unit 310 receives an input command to start a sound quality evaluation of the sound output apparatus 400.

The test sound measuring unit 320 is positioned near a test sound output unit 430 of the sound output apparatus 400, and measures a test sound generated through the test sound output unit 430 and converts a sound wave of the test sound measured to an electrical signal.

At this time, the test sound measured includes an original sound, distortion at the sound output apparatus, and noise.

The test sound measuring unit 320 includes a microphone configured to generate an electrical signal according to a vibration of a sound wave received, and such a microphone maintains a certain distance I from the test sound output unit 430 of the sound output apparatus 400.

That is, since an output of the test sound output unit 430 is very small, a certain distance is maintained, that is, as nearly attached as possible, between the test sound output unit 430 and the test sound measuring unit 320.

A microphone uses an unidirectional microphone, thereby minimizing an effect of a surrounding noise.

The evaluating unit 330 evaluates a sound quality of a sound output apparatus based on the test sound measured. A sound quality is evaluated based on a white noise, a broken sound, a degree of occurrence of a buzz and rattle, a degree of noise occurred in a state of a mute sound, a sound volume, and a sound tone of a test sound.

An evaluating unit 330 includes an A/D converting unit 331 configured to convert a signal of a test sound to a digital signal, an analyzing unit 332 configured to analyze a digital signal by a frequency domain and by a time domain, and a determining unit 333 configured to determine a sound quality based on a signal of a frequency domain and a signal of a time domain.

Since the structure of the evaluating unit 330 is same as that of the evaluating unit 130 according to an embodiment, the same description made above will be omitted to avoid redundancy The first controlling unit 340 controls an operation of the test sound measuring unit 320 upon a command to evaluate a sound quality of the sound output apparatus 400 is entered through the first entry unit 310 or a communicating unit (not shown) outside, and controls an operation of the reporting unit 350 when information on the sound quality evaluation is sent from the evaluating unit 330 so that the information on sound quality evaluation of the sound output apparatus 400 may be output.

The first controlling unit 340 stores information on an original sound having about 100 Hz to 2000 Hz in frequencies.

The reporting unit 350 outputs a degree of occurrence of a buzz and rattle, a rate of occurrence of a white noise, a rate of a sound volume of a broken sound, and a sound volume in numeric figures, and also outputs a status whether a broken sound is normal, whether a sound volume is normal, whether a sound tone is normal, whether a noise occurs in a state of a mute sound, whether a white noise is normal, and whether a buzz and rattle is normal.

Such a reporting unit 350 includes a displaying unit configured to directly display the information on sound quality evaluation of the sound output apparatus 400, or includes a communicating unit configured to send the information on sound quality evaluation of the sound output apparatus 400 to an outside apparatus.

The sound output apparatus 400 which includes a television, a MP3 device, etc. and is a device which is evaluated with reference to a sound quality in a state of a finished product, in a half finished state at a production/manufacturing line or a development state, and is shipped only when a sound quality is determined as normal.

The sound output apparatus 400 includes a second entry unit 410, a second controlling unit 420, the test sound output unit 430, and a storing unit 440.

The second entry unit 410 receives a command to start a sound quality evaluation of the sound output apparatus 400.

The second controlling unit 420 controls a replay of an original sound stored in the storing unit 440 and controls an operation of the test sound output unit 430 upon a command to start an evaluation of a sound quality is entered through the second entry unit 410 or a communicating unit (not shown) or outside.

That is, the second controlling unit 420 generates a sound corresponding to a signal of an original sound by controlling the operation of the test sound output unit 430. At this time, a sound source is output to outside through the test sound output unit 430 after passing through a codec.

The test sound generating unit 430 outputs an original sound according to a command of the second controlling unit 420.

At this time, the original sound output through the test sound generating unit 430 is mixed with a distortion and a noise.

That is, an original sound intended to be generated by the sound output generating unit 400 is output as a test sound which is mixed with a noise as a result of an abnormal condition or a normal condition of the sound input/output apparatus 400.

The test sound generating unit 430 includes a speaker configured to output a sound wave into an air after converting an original sound of an electrical signal to a vibration of a diaphragm, and a receiver configured to convert an electrical vibration, which is generated by a change of a direction and a size of an electrical signal, to a sound vibration. Such a speaker or a receiver maintains a certain distance I from the test sound measuring unit 320 of the sound quality evaluation apparatus 300. A certain distance is the distance such that the test sound measuring unit 320 and the test sound output unit 430 are positioned as nearly attached as possible.

The storing unit 440 stores an original sound for evaluating a sound quality of the sound input/output apparatus 400.

A sound quality evaluation may be performed on other various sound output apparatuses, other than a mobile terminal, such as a digital camera having recording/playing functions, or on the apparatuses which may only support an output of a sound, such as a television, a MP3 device, an audio player, a home theatre, a navigation system, etc.

Also, an automated sound quality evaluation may be realized at a production/manufacturing site without having to establish a dead-sound chamber condition, thereby able to reduce spatial/cost investments needed to establish a dead-sound chamber condition, as well as an occurrence of an industrial accident.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus for evaluating sound quality comprising:
an original sound generating unit;
a test sound measuring unit configured to measure a test sound generated from a subject of sound quality evaluation;

an analyzing unit configured to analyze the test sound according to a frequency domain;

a determining unit configured to determine a degree of occurrence of a buzz and rattle occurred based on a plurality of Harmonics corresponding to a fundamental frequency in the frequency domain;

a controlling unit configured to control an occurrence of the original sound; and a reporting unit configured to output the degree of occurrence of a buzz and rattle generated from the subject of sound quality evaluation, wherein the controlling unit is configured to control the operation of the reporting unit to output the degree of occurrence of the buzz and rattle generated from the subject of sound quality evaluation.

2. The apparatus of claim 1, wherein the determining unit calculates an average size of surrounding frequencies for each Harmonic, calculates each Peak by deducting the average size of the surrounding frequencies from a size of each Harmonic, calculates a Peak Sum by adding each Peak, and determines the degree of occurrence of the buzz and rattle based on the Peak Sum calculated.

3. The apparatus of claim 1, wherein the determining unit determines a sound volume of the measured tested sound as a sound volume in decibel units based on a signal of the measured test sound.

4. The apparatus of claim 1, wherein the determination unit checks a center frequency of the frequency domain, and determines whether a sound tone is normal by comparing a frequency of the original sound with the checked center frequency.

5. The apparatus of claim 1, wherein the controlling unit controls a halt of the original sound generating unit and an operation of the test sound measuring unit when testing a mute sound, and the determining unit determines whether a noise is generated in a state of a mute sound by determining if a signal of a test sound measured at the time of the original sound generating unit is halted is within a range allowed.

6. The apparatus of claim 1, wherein the determining unit determines a sound volume of the measured test sound as a sound volume in decibel units based on a signal of the measured test sound, and determines whether a broken sound has occurred by comparing a minimum value of the sound volume determined with a maximum value of the sound volume determined in decibel units.

7. The apparatus of claim 1, wherein the determining unit calculates an auto-correlation coefficient with reference to a signal of the test sound measured, and determines whether a white noise has occurred based on the auto-correlation coefficient calculated.

8. An apparatus for evaluating sound quality comprising:
an original sound generating unit configured to generate an original sound a test sound measuring unit configured to measure a test sound generated from a subject of sound quality evaluation;

an analyzing unit configured to analyze the measured test sound according to a time domain;

a determining unit configured to generate a plurality of delay signals by delaying a signal of the time domain by a certain period at a time, and to determine whether a white noise has occurred by comparing the signal of the time domain with each delay signal;

a controlling unit configured to control an occurrence of the original sound; and a reporting unit configured to output a status of whether a white noise is generated from the subject of sound quality evaluation, wherein the controlling unit is configured to control the operation of the reporting unit to output the status of whether the white noise is generated from the subject of sound quality evaluation.

9. The apparatus of claim 8, wherein the determining unit calculates an auto-correlation coefficient for each delay signal by comparing the signal of the time domain with each delay signal, and determines whether a white noise has occurred based on a change of the each auto-correlation coefficient calculated.

10. The apparatus of claim 9, wherein the determining unit compares a first auto-correlation coefficient which is calculated by comparing a first delay signal, which is one of the delay signals, with the signal of the time domain, with a second auto-correlation coefficient which is calculated by comparing a second delay signal that is delayed by one period than the first delay signal among the delay signals with the signal of the time domain; and determines a defect by an occurrence of a white noise if the second auto-correlation coefficient is greater than the first auto-correlation coefficient.

11. The apparatus of claim 10, wherein the determining unit determines a defect by an occurrence of a white noise if the first auto-correlation coefficient is greater than the second auto-correlation coefficient by a certain value or above.

12. The apparatus of claim 8, wherein the determining unit determines a sound volume of the measured test sound as a sound volume in decibel units based on a signal of the measured test sound, and determines whether a sound volume is normal by comparing the determined sound volume in decibel units with a standard sound volume.

13. The apparatus of claim 8, wherein
the analyzing unit analyses a signal of the measured test sound according to a frequency domain, and
the determining unit checks a center frequency of the frequency domain, and determines whether a sound tone is normal by comparing the checked center frequency with a frequency of the original sound.

14. The apparatus of claim 13, wherein the determining unit determines a degree of occurrence of a buzz and rattle based on a size of a plurality of Harmonics corresponding to a fundamental frequency in the frequency domain.

15. The apparatus of claim 8, wherein
the controlling unit controls a halt of the original sound generating unit and an operation of the test sound measuring unit, and
the determining unit determines whether a noise is generated in a state of a mute sound by determining if a signal of a test sound measured at the time of the original sound generating unit is halted is within a range allowed.

16. The apparatus of claim 13, wherein the determining unit determines a sound volume of the measured test sound as a sound volume in decibel units based on a signal of the measured test sound, divides the sound volume in decibel units into a plurality of sections according to a time, and determines whether a broken sound has occurred by calculating a rate of difference between a minimum value of the sound volume and a maximum value of the sound volume at each section.

17. A method of evaluating sound quality comprising:
generating an original sound;
measuring a test sound generated from a subject of sound quality evaluation;

analyzing, using at least one processor, the measured test sound according to a time domain;
generating a plurality of delay signals by delaying a signal of the time domain by a certain period at a time;
determining a degree of matching by matching the signal of the time domain with each delay signal;
determining whether a white noise has occurred based on the degree of matching; and
outputting a status of occurrence of the white noise.

18. The method of claim 17, wherein the determining of occurrence of white noise based on the degree of matching comprises:
calculating an auto-correlation coefficient that corresponds to a degree of matching between the signal of the time domain and each delay signal;
dividing each auto-correlation coefficient according to the number of delayed periods of the delay signal matched to the signal of the time domain; and
determining whether a white noise has occurred based on the auto-correlation coefficient divided.

19. The method of claim 18, wherein the determining of whether the white noise has occurred based on the degree of matching comprises:
comparing consecutive auto-correlation coefficients, and
determining of a defect by an occurrence of a white noise if one of the consecutive auto-correlation coefficients is greater than the other auto-correlation coefficient by a certain value or above.

20. The method of claim 17, further comprising:
determining of a sound volume of the measured test sound as a sound volume in decibel units based on the measured test sound, and
indicating the sound volume determined in decibel units.

21. The method of claim 20, further comprising:
comparing a standard sound volume with the sound volume determined in decibel units, and
indicating a defect of the sound volume if the determined sound volume in decibel units exceeds the standard sound volume.

22. The method claim 17, further comprising:
determining a sound volume of the measured test sound as a sound volume in decibel units based on a signal of the measured test sound;
dividing the sound volume in decibel units into a plurality of sections according to a time;
calculating a rate of difference between a minimum value of the sound volume and a maximum value of the sound volume at each section, and
indicating the rate of each section calculated.

23. The method of claim 22, wherein further comprising:
comparing the rate of each section with a certain rate;
determining of a defect by an occurrence of a broken sound if a section having a rate less than the certain rate exists among the plurality of sections; and
indicating the defect by occurrence of the broken sound.

24. The method of claim 17, further comprising:
halting a generation of an original sound upon a request for a mute sound test is made;
measuring a test sound generated through a subject of sound quality evaluation;
determining whether a signal of the test sound measured at the time of the original sound generation is halted is within a range allowed;
determining of an occurrence of a white noise in a state of a mute sound if the signal of the test sound measured is out of the range allowed; and
indicating as a defect by an occurrence of a noise in a state of the mute sound.

25. The method of claim 17, further comprises:
analyzing the signal of the test sound measured according to a frequency domain;
determining a degree of occurrence of a buzz and rattle based on a size of a plurality of Harmonics corresponding to a fundamental frequency within the frequency domain; and
indicating a degree of occurrence of the buzz and rattle generated from the subject of sound quality evaluation.

26. The method of claim 25, wherein the determining of the degree of occurrence of the buzz and rattle based on the size of the plurality of the Harmonics comprises:
calculating an average size of surrounding frequencies for each Harmonic;
calculating each Peak by deducting the average size of the surrounding frequencies from a size of each Harmonic according to each Harmonic and calculating a Peak Sum by adding each Peak; and
determining a degree of occurrence of the buzz and rattle based on the Peak Sum calculated.

27. The method of claim 26, further comprising determining occurrence of the buzz and rattle if the Peak Sum calculated exceeds a standard Peak Sum.

28. The method of claim 17, further comprises:
checking a center frequency of the frequency domain;
determining whether a sound tone is normal by comparing the center frequency checked with a frequency of the original frequency; and
indicating a status whether the sound tone is normal.

29. An apparatus for evaluating a sound quality of a subject of sound quality evaluation and for outputting an original sound stored in advance as a test sound, the apparatus comprising:
a test sound measuring unit configured to measure a test sound generated from the subject of sound quality evaluation;
an analyzing unit configured to analyze a signal of the measured test sound according to a time domain and according to a frequency domain;
a determining unit configured to determine a degree of a buzz and rattle occurred based on a plurality of Harmonics corresponding to a fundamental frequency within the frequency domain, to calculate an auto-correlation coefficient with reference to a signal of the time domain, and to determine whether a white noise has occurred based on the auto-correlation coefficient calculated;
a controlling unit configured to control an occurrence of the original sound; and
a reporting unit configured to output the degree of the occurrence of the buzz and rattle and the status of occurrence of the white noise generated from the subject of sound quality evaluation,
wherein the controlling unit is configured to control the operation of the reporting unit to output the degree of occurrence of the buzz and rattle and the status of occurrence of the white noise generated from the subject of sound quality evaluation.

30. The apparatus of claim 29, wherein the determining unit calculates an average size of surrounding frequencies by each Harmonic, calculates each Peak by deducting the average size of the surrounding frequencies from a size of each Harmonic, calculates a Peak Sum by adding each Peak, and determines the degree of occurrence of the buzz and rattle based on the Peak Sum calculated.

31. The apparatus of claim 29, wherein the determining unit determines a sound volume of the measured test sound as a sound volume in decibel units based on a signal of the measured test sound.

32. The sound quality evaluation apparatus of claim 29, wherein the determining unit checks a center frequency of the frequency domain, and determines whether a sound tone is normal by comparing a frequency of the original sound with the checked center frequency.

33. The sound quality evaluation apparatus of claim 29, wherein the determining unit measures a test sound generated from the subject of sound quality evaluation when a test sound with reference to a mute sound is generated, and determines whether a noise has occurred at a state of a mute sound by determining if a signal of the measured test sound is within a range allowed.

34. The sound quality evaluation apparatus of claim 29, wherein the determining unit determines a sound volume of the measured test sound as a sound value in decibel units based on a signal of the measured test sound, and determines whether a broken sound is occurred by comparing a minimum value of the sound volume with a maximum value of the sound volume determined in decibel units.

35. The sound quality evaluation apparatus of claim 29, wherein the determining unit generates a plurality of delay signals by delaying a signal of the time domain by a certain period at a time, compares a first auto-correlation coefficient which is calculated by comparing a first delay signal, which is one of the plurality of delay signals, with the signal of the time domain, and a second auto-correlation coefficient which is calculated by comparing a second delay signal that is delayed by one period than the first delay signal with the signal of the time domain;

and determines a defect by an occurrence of a white noise if the second auto-correlation coefficient is greater than the first auto-correlation coefficient.

36. At least one non-transitory computer readable medium storing computer readable instructions that control at least one processor to implement the method of claim 17.

37. A method of evaluating sound quality comprising:
generating an original sound;
measuring a test sound generated from a subject of sound quality evaluation;
analyzing, using at least one processor, the measured test sound according to a frequency domain;
determining a degree of occurrence of a buzz and rattle occurred based on a plurality of Harmonics corresponding to a fundamental frequency in the frequency domain;
controlling an occurrence of the original sound; and
outputting the degree of occurrence of the buzz and rattle.

38. At least one non-transitory computer readable medium storing computer readable instructions that control at least one processor to implement the method of claim 37.

\* \* \* \* \*

UNITED STATES PATENT AND TRADEMARK OFFICE
CERTIFICATE OF CORRECTION

PATENT NO.         : 9,025,781 B2                                    Page 1 of 1
APPLICATION NO.    : 13/658195
DATED              : May 5, 2015
INVENTOR(S)        : Sung Su Park et al.

It is certified that error appears in the above-identified patent and that said Letters Patent is hereby corrected as shown below:

In the claims

Claim 22, Column 21, Line 41

After "method" insert --of--.

Signed and Sealed this
Thirteenth Day of October, 2015

Michelle K. Lee
*Director of the United States Patent and Trademark Office*